D. TABUCCHI.
DOUGH PRESS.
APPLICATION FILED JUNE 8, 1920.
1,420,066. Patented June 20, 1922.
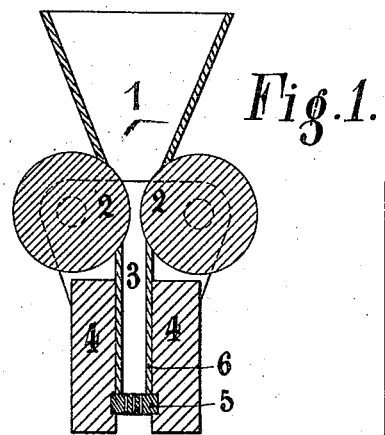
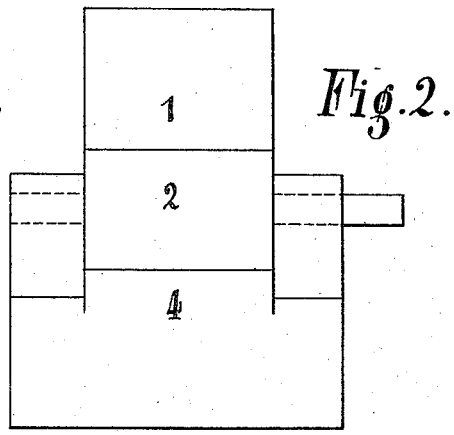
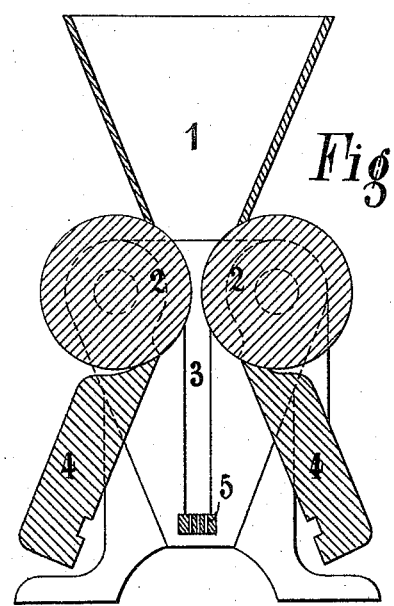
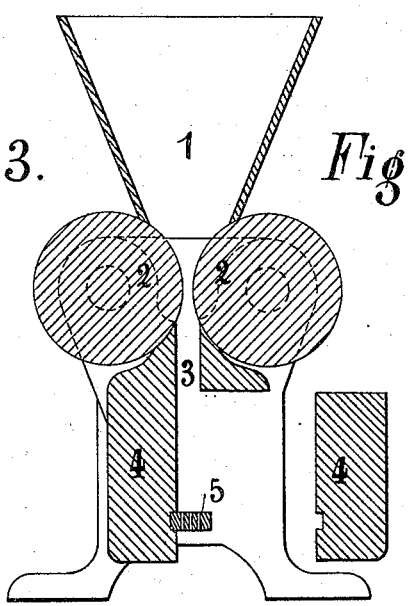
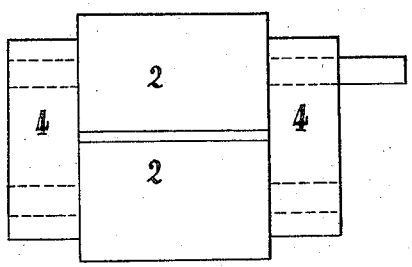

UNITED STATES PATENT OFFICE.

DARIO TABUCCHI, OF NICE, FRANCE.

DOUGH PRESS.

1,420,066.	Specification of Letters Patent.	Patented June 20, 1922.

Application filed June 8, 1920. Serial No. 387,502.

*To all whom it may concern:*

Be it known that I, DARIO TABUCCHI, a subject of the King of Italy, residing at Nice, Alpes Maritimes, France, have invented certain new and useful Improvements in Dough Presses (for which I have filed application in France June 6, 1919), of which the following is a specification.

Alimentary doughs have been hitherto manufactured by means of presses constituted in principle by a cast iron or steel container which was filled with dough, and a piston driven in any desired manner into the container. This piston squirted the said dough through a mould to give it the desired shape. When the propelling and forcing piston arrived at the bottom of the container, it had to be raised, and the container again charged with dough, which resulted in an interruption of the manufacture and in a considerable loss of time. Moreover, this periodical interruption of working presented a serious obstacle to efficient organization, and to the regular movement of the products manufactured.

The press according to this invention renders possible continuous manufacture and therefore avoids any loss of time, and also enables the press to be quickly and easily cleaned.

In the accompanying drawing several presses are shown, by way of example,

Figure 1 is a sectional elevation of a small press,

Figure 2 a side elevation of the same,

Figure 3 is a sectional elevation of a large press,

Figure 4 a similar view showing a modified construction, and

Figure 5 a plan of the driving rollers, with the hopper removed.

In the drawings, 1 is the feed hopper receiving the dough as it issues from the kneader or mixer, 2 are the rollers between which the dough passes and which, owing to their rotary movement, continuously drive and compress it into the interior of the recess 3 which is provided in between the blocks 4. 5 is the plate through which the compressed paste is squirted. 6 (Figure 1) is a lining constituted by a flattened metal tube, the upper portion of which, cut at an angle, engages with the rollers 2, whilst the lower portion rests on the plate 5, so as to prevent any leakage of dough during the operation of the press.

As will be seen, if the hopper 1 of the machine is fed so as to keep it always filled with dough, continuous working will be obtained during the whole time. In this way, a much larger output is obtained with the same amount of labour, and a better organization and efficiency of the auxiliary apparatus, such as folding devices, dryers, etc.

Another advantage of this press is that it may be quickly and easily cleaned.

As already stated, the small presses (Figure 1) are provided in the interior with a lining 6, the large presses (Figures 3 and 4) are without a lining.

In the case of small presses, the process of cleaning is as follows: As soon as the work is finished, the plate 5 is removed or shifted by sliding it to the side, and the lining 6 is removed through the bottom of the press.

In the case of large presses (Figures 3 and 4) which are without linings, the blocks 4 can be moved apart, as shown in Figure 3, by turning the two blocks about the axis of the rollers 2, or, as in the modified construction shown in Figure 4, by removing only one of the blocks 4, whereupon the cleaning can be easily effected.

What I claim as my invention and desire to secure by Letters Patent is:—

1. A dough press including a feed hopper, means for driving the dough from the hopper, including two rolls, two blocks below the rolls between which the dough is forced to pass, and a lining therebetween, extending upwardly in proximity to said rolls, the upper edge of which is beveled to scrape the dough from the rolls.

2. The device of claim 1, said blocks having recesses therein adapted to enclose and hold between the blocks a perforated plate.

In testimony whereof I have signed my name to this specification in the presence of two subscribing witnesses.

DARIO TABUCCHI.

Witnesses:
ANTOINE RAYNAUD,
DELLO VALLE TORDINAND.